United States Patent [19]

Lendino

[11] 4,339,950
[45] Jul. 20, 1982

[54] COUNTING MECHANISM ATTACHMENT FOR A FUEL TANK

[76] Inventor: Nicholas C. Lendino, 125 Rhode Island Ave., Massapequa, N.Y. 11758

[21] Appl. No.: 122,566

[22] Filed: Feb. 19, 1980

[51] Int. Cl.³ .......................... G01F 23/08; G06M 1/08
[52] U.S. Cl. .................................. 73/310; 235/61 M; 235/92 FL
[58] Field of Search ............... 73/310, 217, 223, 224, 73/225; 235/61 L, 61 M

[56] References Cited

U.S. PATENT DOCUMENTS

| | | | |
|---|---|---|---|
| 1,281,313 | 10/1918 | Eberhart, Jr. et al. | 73/310 |
| 2,100,052 | 11/1937 | Hejduk et al. | 235/94 R X |
| 2,511,632 | 6/1950 | Gregory | 73/321 |
| 3,365,945 | 1/1968 | Parks | 73/223 |
| 4,129,039 | 12/1978 | Pignato | 73/310 |

FOREIGN PATENT DOCUMENTS 707927 7/1931 France ............................ 73/310

Primary Examiner—Daniel M. Yasich

[57] ABSTRACT

A fuel tank attachment which records the cumulative amount of fuel involved in successive fillings of the tank and also the fuel consumed between fillings, using two digital counters for this purpose, each being of the type that adds in one direction and subtracts in the other. The one counter that records fuel consumption requires this two-directional operational mode wherein it adds from "0" or other selected starting point as fuel is consumed, and subtracts back to "0" when the tank is filled. The other or cumulative counter, however, must be prevented from subtracting, or otherwise the record which it provides will be inaccurate. In accordance with the present invention, the cumulative counter is operated in its adding mode in a positive fashion by a first pawl and ratchet arrangement, and is prevented from operating in its subtracting mode, again in a positive fashion, by a second pawl and ratchet arrangement.

5 Claims, 9 Drawing Figures

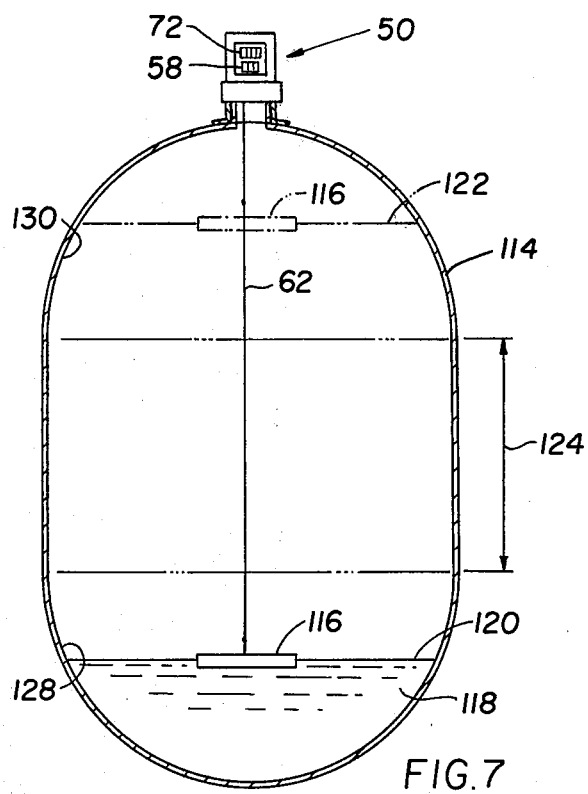
FIG. 7
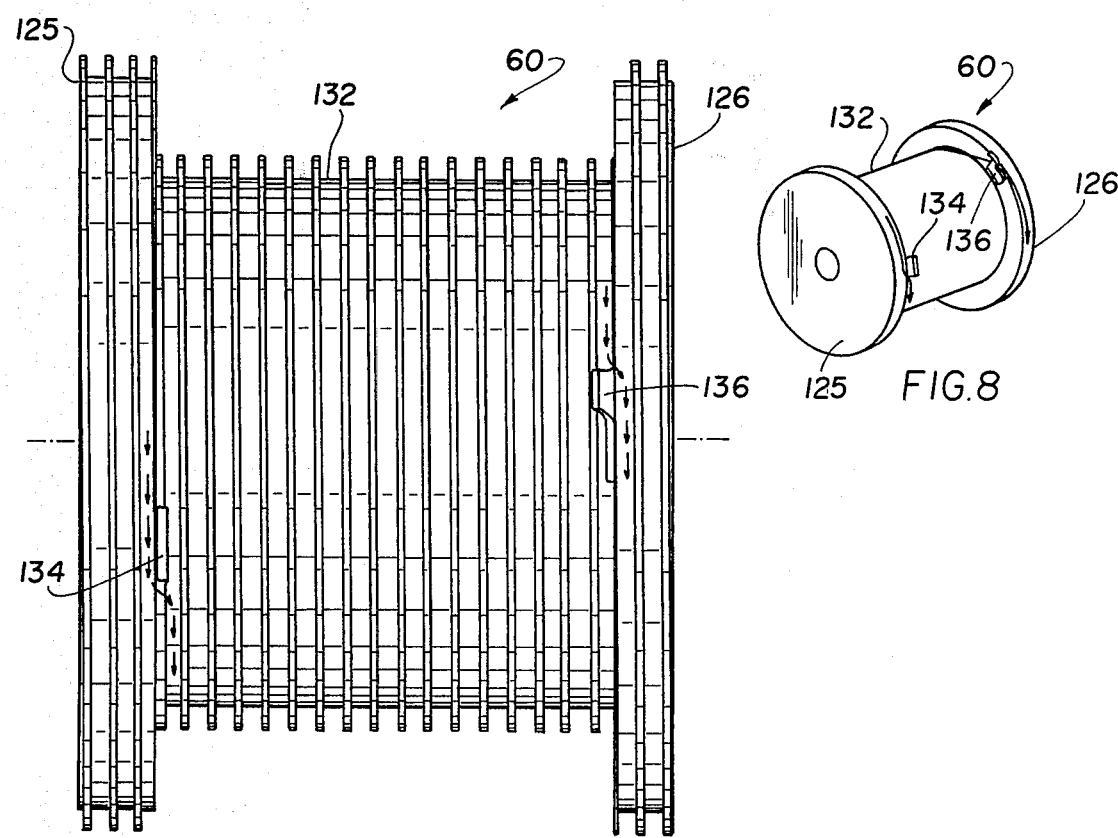
FIG. 8
FIG. 9

COUNTING MECHANISM ATTACHMENT FOR A FUEL TANK

The present invention relates generally to a two-counter recording mechanism for a fuel tank, wherein one counter records fuel consumption and the other provides a cumulative record of successive fillings of the tank, and more particularly to an improved counting mechanism as above generally described, in which a clutch or equivalent component is dispensed with as part of the supervising control of the cumulative counter, to thereby contribute to noteworthy improvements in the accuracy and operation of the mechanism.

Mechanisms which record successive fillings of a fuel storage tank or the like, as well as the amount of fuel consumed between fillings, are already well known, one such mechanism being exemplified by that illustrated and described in U.S. Pat. No. 2,511,632, and also by mechanisms in common use in gasoline stations. The latter are too large and complicated for use as an attachment on home fuel storage tanks, and the former suffer from being critically dependent upon the operation of a clutch or similar component, characteristically embodied therein. The cumulative counter must add in one directional rotation of its shaft input, but will subtract in the opposite directional rotation thereof if permitted to do so. The solution of the prior art is thus to provide a clutch in the operational set-up for the cumulative counter which, as understood, drives in one rotational direction and "slips" in the opposite direction. In actual practice, however, it is difficult to obtain reliable performance to the extent required in these opposite operational modes of a clutch as is necessary for accurate recording of the cumulative counter. Inadvertently there is some "slip" when the clutch is in its "drive" mode, and if this is corrected, the clutch will then produce some "drive" in its "slip" operational mode. In the former situation, not all the movement is being recorded, and in the latter the counter is subtracting and thus introducing inaccuracy in the cumulative record it is intended to provide.

Broadly, it is an object of the present invention to provide an improved fuel tank counting mechanism attachment overcoming the foregoing and other shortcomings of the prior art. Specifically, it is an object in connection with such mechanism to operate the cumulative counter thereof with a positive drive in its adding mode, and with a hold, also applied in a positive manner, against rotation causing its subtracting mode, to thereby enhance the operation of this counter, as well as to improve other construction and operational aspects of the counting mechanism.

A counting mermanism demonstrating objects and advantages of the present invention is, as already noted, of the type which is adapted to be used as an attachment to a fuel tank so as to record the cumulative amount of fuel resulting from the successive filling of said tank and also to record the amount of fuel removed therefrom incident to heating use of said fuel following each said filling. Said mechanism includes two counter-operating rotatable shafts and has a first counter and a second counter respectively mounted on each said shaft so as to provide counting operation in response to shaft rotation. Each said counter is of the type that adds in one shaft rotational direction and subtracts in the opposite shaft rotational direction. To operate the counters a shaft-powering means is provided which is operatively responsive to fuel level changes in the fuel tank, said means being operatively connected to cause rotation in the shaft of said first counter such that said first counter adds from a selected starting reference number to a higher number in response to shaft rotation corresponding to a descending fuel level change so as to record the amount of fuel being consumed. Said counter is also arranged to subtract back to said selected starting reference numeral in response to opposite shaft rotation corresponding to an ascending fuel level change. Completing the mechanism is a gear fixedly mounted on the first counter shaft and a cooperating second gear disposed in intermeshing relation therewith mounted in free wheeling relation on the second counter shaft such that said rotational movements in both rotational directions of the first counter shaft responsive to said fuel level changes are imparted to the free wheeling second gear but not to the shaft supporting same. However, a pawl on the second gear and a ratchet fixedly mounted on the second counter shaft is disposed in cooperating operative relation with each other such that said pawl drivingly engages said ratchet to cause corresponding rotation in said second counter shaft in one rotational direction, but not in said opposite rotational direction. As a result, the second counter is adapted to add cumulatively in response to successive shaft rotations corresponding to ascending fuel level changes to provide a number record of the successive fuel tank fillings without there being any subtraction from such number during rotation of the second gear corresponding to a descending fuel level change. To assure against subtraction, there is additionally provided a second pawl and ratchet operatively associated with the shaft of the second counter so as to block rotation thereof in said direction as might produce subtraction in said second counter but allowing shaft rotation in said opposite rotational direction.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein:

FIG. 1 is a diagrammatic view of a prior art counting mechanism having the same objective as that of the within invention;

Remaining FIGS. 2-9 illustrate a counting mechanism having noteworthy improvements over the prior art version of FIG. 1. More particularly, FIG. 2, illustrates the within inventive counting mechanism in the same diagrammatic perspective as FIG. 1 in order to readily permit a comparison therebetween;

FIG. 7 is a front elevational view, in section, of a typical fuel tank in which the level changes of the fuel contained therein are recorded by the within counting mechanism attachment;

FIG. 8 is a perspective view of the spool component of the counting mechanism; and FIG. 9 is a front elevational view, on an enlarged scale, showing structural details of the spool.

THE PRIOR ART

Figure 1:
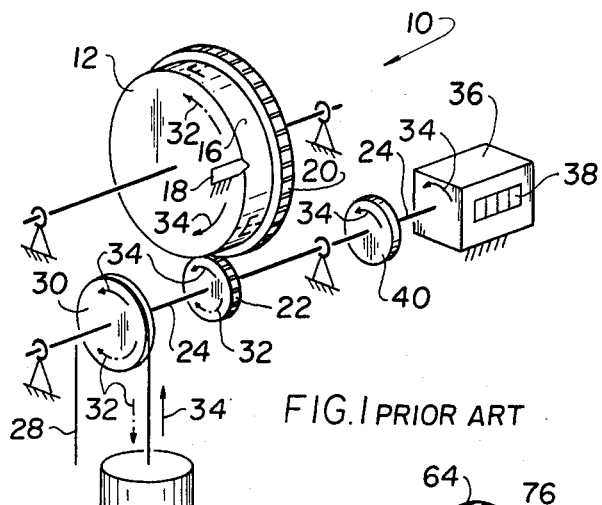

Shown in somewhat simplified and diagrammatic perspective is a prior art mechanism which exemplifies the mechanism illustrated and described in prior U.S. Pat. No. 2,511,632 and which is one of many types of mechanisms which record level changes in fluid storage tanks, particularly tanks containing fuel. Such prior art mechanism, generally designated 10, typically includes a wheel 12 journalled for rotation on a shaft 14 and having indicia in a strategic location, as at 16, related to a storage volume of the fuel in the tank. Thus, indicia 16 might include the letter "F", which when adjacent the pointer 18 indicates that the fuel tank is "full", and also the letter "E" in an appropriate location so that when adjacent the pointer 18, this would be indicative of the fact that the fuel storage tank is "empty". By way of further example, the display on wheel or counter 12 of FIG. 1 is that the fuel tank is "half empty".

Counter 12 also typically includes a circumferential arrangement of teeth 20 which are in meshing engagement with a cooperating gear 22 fixedly mounted on another support shaft 24. Shaft 24, in turn, is adapted to be powered in either clockwise or counterclockwise rotation in response to the ascending or descending movement of a member 26 which includes a cable 28 entrained over a pully 30 fixedly mounted on the shaft 24.

From the foregoing description, although simplified, it should be readily understood that assuming that there is descending movement in member 26, which would occur upon depletion of fuel from the storage tank and thus a decending fuel level change, that such descending movement in member 26 will produce clockwise rotation in shaft 24, denoted by the dash dot reference arrows, individually and collectively designated 32. As should be readily apparent from FIG. 1, the intermeshing relation between gear 22 and the teeth 20 will produce counterclockwise rotation in the counter 12, again as denoted by the arrow 32. Thus, assuming that pointer 18 is adjacent the indicia letter "F", indicating that the storage tank is full, descending movement in member 26, which is the direction of movement that would occur as fuel is consumed, will result in counterclockwise rotation 32 in the counter 12 and thus in movement in this component in that rotational direction that will advance the letter "E", for "empty", into position adjacent the pointer 18. In summary, it should therefore be readily appreciated that the counter 12 provides a recording of the amount of fuel consumed in the storage tank.

Also, when the fuel consumed is replenished, as occurs when the tank is filled, it is to be understood that this will result in ascending movement in the member 26, such movement being denoted by the full line arrows, individually and collectively designated 34. The result of such movement and, more particularly, clockwise movement 34 in the wheel 12, is that such wheel subtracts, so to speak, and thus restores the starting reference point, namely the letter "F", to an appropriate position adjacent the pointer 18. In this manner, the prior art arrangement 10 of FIG. 1 is effective in recording the amount of fuel consumed.

As is also characteristic of prior art arrangements, as exemplified by that described and illustrated in the referred to patent and illustrated in FIG. 1, provision is also made for recording the cumulative amount of fuel that is placed in the storage tank for use. Thus, over a typical heating season during which the tank is successively filled when needed, it is desirable to know how much fuel was involved during the successive fillings of the tank. In the prior art, there is therefore provided a counter 36 usually of the digital type, and which is operatively associated with shaft 24 such that rotation of said shaft results in counting operation of the counter 36. More particularly, counter 36 is of the type that adds in one rotational direction of the shaft with which it is operatively associated, and subtracts in an opposite directional rotation. Thus, since counter 36 is provided to record the cumulative amount of fuel involved in successive fillings of the storage tank, such counter, as clearly illustrated in FIG. 1, is operatively associated with shaft 24 such that counterclockwise rotation of the shaft, as denoted by arrow 34, results in the adding operation thereof. Since counter 36 would also subtract when shaft 24 is rotated in a clockwise direction, it is of course necessary to prevent clockwise rotation in shaft 24 since this would render the count of the display 38 of counter 36 inaccurate.

The prior art solution for obviating subtraction in the counter 36 is to provide a one way clutch 40 at the strategic location along shaft 24 as illustrated. As understood, clutch 40 is effective to drive the extension of shaft 24 that is actually connected to the counter 36 only in the counterclockwise direction 34. The opposite, or clockwise direction, however, is the so-called "slip" direction of clutch 40 which, as is well understood, is the direction in which there is no driving connection between the driving and driven components of the clutch 40.

Among other shortcomings of the prior art, and as should be readily understood from the foregoing description, is that the accuracy of the counter 36, which provides the cumulative record of the total amount of fuel placed in the storage tank over a typical heating season, is dependent upon the efficiency of operation of the clutch 40. That is, if there is some inadvertent "slip" during the time that clutch 40 is required to provide a positive drive of the shaft input of counter 36, the numerical record being displayed by such counter will be of course less than it should be. Also, from the other point of view, if clutch 40 inadvertently has dome degree of drive when it should be in its "slip" operation, this will result in subtracting operation of the counter 36 which also will introduce an inaccuracy in the record which it is intended to provide. Thus, the efficacy of the prior art arrangement 10 of FIG. 1 is critically dependent upon the operation of the clutch 40. Yet, as is readily understood, it is very difficult to achieve the two opposite operational modes of "slip" and "drive" in any clutch, since the operational parameters for each are exactly opposite.

THE INVENTION

The improved arrangement of the present invention obviates shortcomings of the prior art, and particularly problems associated with using a clutch in the operation of the cumulative counter. That is, and as will be more apparent as the description proceeds, the within inventive set-up does not require the use of a clutch, but instead utilizes means for transmitting rotational movement to the shaft input of the cumulative counter which contributes to the utmost accuracy of the information being recorded by this counter. More particularly, the drive is positive to provide that rotational directional movement in the shaft which is required to produce adding operation of the cumulative counter and, particularly important, such shaft is also held, by positive means, against partaking of opposite directional rotation, thereby obviating any possibility of inaccuracy in the record of the cumulative counter due to any inadvertent subtraction.

Figure 2:
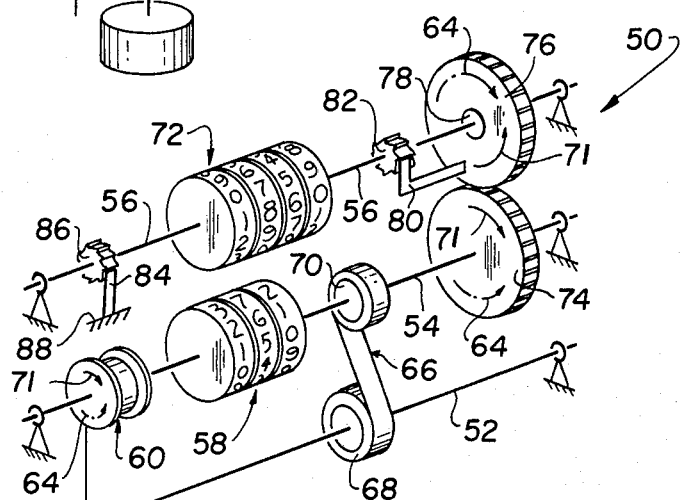

To better understand the contribution of the within inventive counting mechanism to the prior art, reference should be made to FIG. 2 in which such counting mechanism is illustrated in the same diagrammatic perspective as the prior art counting mechanism of FIG. 1 in order to enhance making a comparison between the two. As is illustrated in FIG. 2, the within inventive counting mechanism, generally designated 50, includes three support shafts 52, 54 and 56. Shaft 54 has fixedly mounted thereon a digital-type counter 58 which, like the prior art counter 12, records the amount of fuel consumed between fillings of the supply tank. This objective is achieved by having also fixedly mounted on shaft 54 a spool 60 having a cable connection 62 to a float, later to be described, which is disposed in the storage tank and which will be understood to rise and fall in accordance with fuel level changes in the storage tank. Thus, assuming a full condition in the fuel tank, use of the fuel will of course deplete the supply and result in descending movement in the float and thus also in the cable 62, such directional movement and movements which it produces being denoted by the dot dash arrows, individually and collectively designated 64. More particularly, descending movement of the float pulls down on cable 62 causing counterclockwise rotation in spool 60 and thus counterclockwise rotational movement in shaft 54 which, it will be understood, causes counter 58 to add and thus record the amount of fuel being consumed. When the tank is filled in a manner which will subsequently be described, this will result in clockwise rotation in shaft 54, and thus will result in subtracting operation of the counter 58. Thus counter 58, like the prior art counter 12, will return to "0" or some other convenient starting reference point when the fuel supply in the storage tank is replenished.

Continuing with the description of the within inventive counting mechanism as illustrated in FIG. 2, use is made of a constant torque spring 66, of any well known and readily commercially available type, which is operatively arranged on the two shafts 52 and 54 such that spring 66, when permitted to do so, will pay out from its coil arrangement 68 supported on shaft 52 and add to the helically coiled arrangement that is supported on shaft 54. As is well understood, this movement of spring 66 results in shaft 54 being powered in a clockwise directional movement, as noted by the solid line arrows, individually and collectively designated 71. As indicated, spring 66 is released so it can provide clockwise directional movement 71 by virtue of the float in the storage tank rising with the level of the fuel as a result of the fuel supply being replenished, such ascending movement of the float resulting in movement 71 in the cable 62 and a corresponding wind-up operation of spool 60.

Rotational movement 71, which corresponds with replenishing the fuel supply of the storage tank must of course be transmitted to the equivalent of the prior art cumulative counter 36. Such counter of the within inventive counting mechanism is designated 72 and is supported on, and actuated in counting operation by the rotation of, shaft 56. In this regard, counter 72, like the prior art counter 36, is of the type that adds in one rotational direction of shaft 56 and subtracts in the opposite rotational direction. It is thus necessary to assure that shaft 56 of the counter 72 rotates only in that rotational direction which causes adding operation of counter 72 and not in an opposite rotational direction, since this would produce subtraction in the counter 72. In terms of the rotational arrows, it is thus necessary that the portion of shaft 56 actually physically connected to counter 72 rotate only in the counterclockwise direction 71, but not in the clockwise direction 64.

To achieve the aforesaid, a drive mechanism is provided between the shafts 54 and 56 that includes a pair of intermeshing gears 74 and 76. Gear 74 will be understood to be fixedly mounted on shaft 54 so that it rotates in both rotational directions of the shaft. Gear 76, on the other hand, will be understood to be mounted on a ball bearing or similar component 78, so that it is free wheeling with respect to the shaft 56. As a result, rotational movement of gear 74 in both clockwise and counterclockwise directions 71 and 64 is effectively transmitted to gear 76 by virtue of the intermeshing relationship between the two. However, neither of these rotational movements is directly transmitted to shaft 56 because gear 76 is mounted on the ball bearing 78. To transmit counterclockwise movement 71, however, gear 76 has a pawl 80, the details of which are later described, which has an operative association with a ratchet 82 that is fixedly mounted on shaft 56. Thus, as is readily understood in connection with pawl and ratchet arrangements, pawl 80 is effective in driving ratchet 82 only in the counterclockwise direction 71, and has a non-driving relationship therewith in the opposite or clockwise direction 64. As a consequence, the shaft connection 56 to the counter 72 is only rotated in the counterclockwise direction 71, and thus only operates counter 72 in its adding mode.

When gear 76 is powered in clockwise rotation 64, the non-driving relation of the pawl and ratchet arrangement 80, 82 is not solely relied on to obviate any possibility of subtraction in the counter 72. Rather, and in accordance with the present invention, provision is made for a second pawl and ratchet 84, 86 to be associated with the shaft 56. As diagrammatically illustrated in FIG. 2, pawl 84 is stationarily mounted at one end, as at 88, and at its other end is in physical contact with the teeth of ratchet 86 which will be understood to be fixedly mounted on the shaft 56. The arrangement of the pawl and ratchet 84, 86 is such that ratchet 86 is physically prevented by pawl 84 from rotating in a clockwise direction, but not in a counterclockwise direction. In the manner as just described, therefore, the cumulative counter 72 is thus operated in its adding mode in a positive fashion by the pawl and ratchet arrangement 80, 82 and is prevented from operating in its subtracting mode, again in a positive fashion, by the other pawl and ratchet arrangement 84, 86.

A PREFERRED EMBODIMENT

Figures 3, 4:
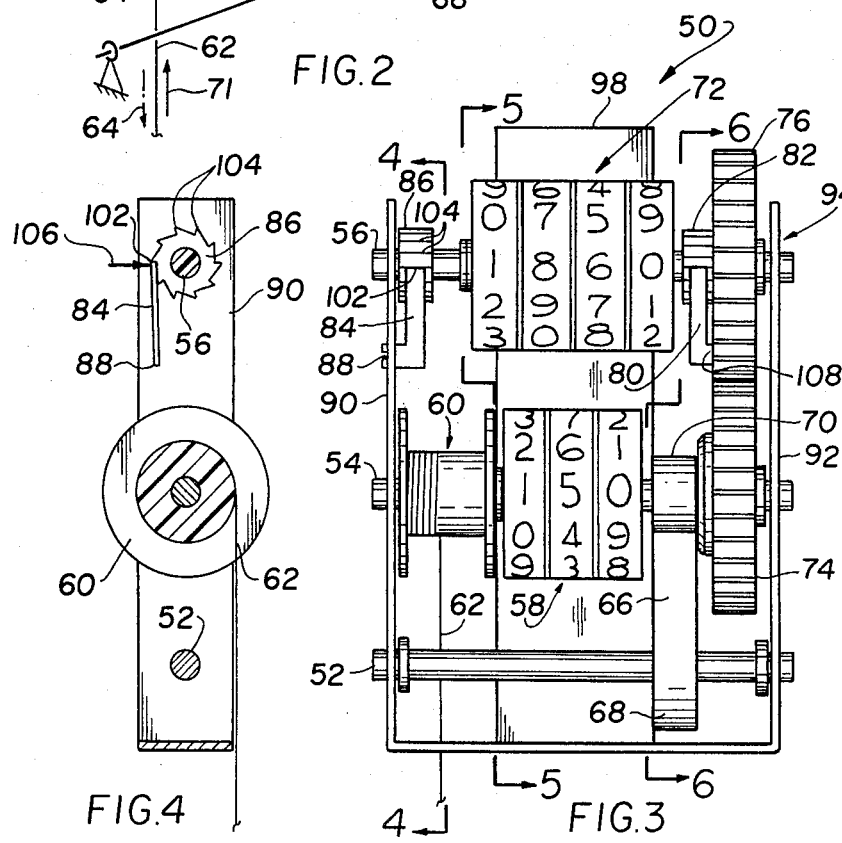
FIG. 3 is a front elevational view of the counting mechanism hereof.
FIG. 4 is a side elevational view, in section taken along line 4—4 of FIG. 3, illustrating further structural details thereof.

Although it is believed that the within inventive counting mechanism is readily understood from the description already provided in connection with FIG. 2, for completeness' sake the description thereof will be somewhat repeated, but in connection with a mechanism illustrated in elevational views, which better illustrate structural details, in remaining FIGS. 3-9. Referring to these figures, in which the components already referred to in connection with FIG. 2 are designated by the same reference numeral, it will be noted that the within inventive counting mechanism is of a compact nature wherein the three shafts 52,54 and 56 (see in particular FIG. 3) are appropriately journalled for rotation in spanning relation between upright walls 90 and 92 of an appropriate supporting housing, generally designated 94. Shaft 52 mounts, as already noted, the supply coil 68 of the spring 66, while the wind-up coil of such spring, denoted by the reference numeral 70 in FIG. 3, is mounted on shaft 54.

Figure 5:
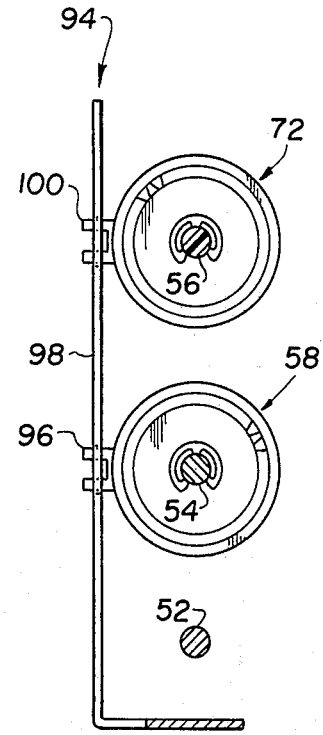
FIG. 5 is similarly a side elevational view, but taken in section along line 5—5 of FIG. 3, illustrating the mounting of the two counters and cooperating rotatable shafts.

Shaft 54 also mounts, from left to right as viewed in FIG. 3, the spool 60 for the cable 62, the fuel consumption-recording counter 58, the constant torque spring coil 70, and finally the gear 74. Counter 58, illustrated in FIG. 3, is intended to depict a commercially available shaft-operated digital-type counter, such as Model Series 1771, that is readily available from Veeder-Root of Hartford, Conn. Such counter, as is well understood, provides counting operation in response to rotation of shaft 54 upon which it is mounted. More particularly, and again as is well understood, the operational mode of this commercially available counter is one which provides for ten counts for each input revolution, for each wheel, a three-wheel embodiment being preferred for the counter 58. Also, as already noted, counter 58 records in both operational directions of shaft 54, which are clockwise rotations 71 providing counter 58 with its adding mode, while counterclockwise movement 64 causes such counter to subtract. Further details concerning counter 58 are believed not to be necessary, except perhaps to note, as best illustrated in FIG. 5, that those components for each wheel of the counter 58 which must be held stationary in order to provide effective counting operation are effectively held stationary by being connected to a rearwardly extending tab 96 which is confined against movement by an encircling opening in a rear wall 98 of housing 94. A similar rearward extension 100 performs the same function for the cumulative counter 72.

Figure 6:
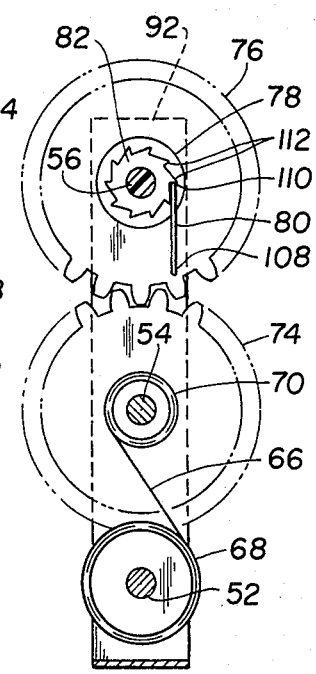
FIG. 6 is still another side elevational view related to FIG. 3, the same being taken along line 6—6 thereof, and best illustrates the manner in which rotational movement is imparted to the rotationally mounted components.

Continuing with the description of the more detailed showing of the within inventive counting mechanism, the same, as is perhaps best illustrated in FIG. 3 in conjunction with FIGS. 4 and 6, has mounted on shaft 56 between the vertical walls 90 and 92 the pawl and ratchet arrangement 84, 86, a four-wheel embodiment functioning as the cumulative counter 72, and finally the pawl and ratchet arrangement 80, 82 for transmitting one directional rotation movement between the free wheeling gear 76 and the cumulative counter shaft 56.

The details of the construction of the pawl and ratchet arrangement 84, 86 can best be appreciated by consideration of FIGS. 3 and 4. As illustrated therein, pawl 84 is fixedly mounted, as at 88, to housing wall 90 and has its opposite or free end 102 in an advantageous position to engage the ratchet teeth, individually and collectively designated 104, and thus prevent rotational movement 64 in shaft 56. In a preferred embodiment of pawl 84, this component is comprised of a springy metal so that there is actually a spring urgency in the direction 106 which maintains the end 102 of pawl 84 in physical contact against the ratchet 86.

Turning now to the details of the construction and operational set-up of the other pawl 80, 82, it is believed that these details can best be understood from a consideration of FIG. 3 in conjunction with FIG. 6. As shown in these figures, pawl 80 is attached in any appropriate manner such as welding or the like at one end, as at 108, to one side of gear 76 and has its opposite or free end 110 in an advantageous position to engage with the teeth, individually and collectively designated 112, of the ratchet 82. As perhaps can best be appreciated from FIG. 6, pawl 80 is appropriately oriented so that it engages with a cooperating ratchet tooth 112 and is effective in urging ratchet 82 and thus shaft 56 on which ratchet 82 is fixedly mounted, in the rotational direction 71. When gear 76 is rotated in the opposite rotational direction 64, however, the free end 110 of pawl 80 slides without any driving effect over the ratchet teeth 112 and thus does not produce any rotational movement 64 in the shaft 56, as is required in order to obviate any subtraction in the cumulative counter 72.

In a preferred embodiment, pawl 80, like pawl 84, is also fabricated of a springy material so that there is a spring urgency biasing the free end 110 thereof into proper position for engagement with the ratchet 82. It is to be noted that because pawl 80 actually drives ratchet 82 it must be of an appropriate thickness and must be fabricated of a construction material of sufficient rigidity to achieve this objective without buckling. These requirements may result in the free end 110 of pawl 80 being firmly biased or urged against the ratchet 82. Nevertheless, there is no possibility that the physical contact between the pawl 80 and ratchet 82, even if established under an extensive spring urgency, will result in inadvertent rotational movement 64 in ratchet 82 when gear 76 is rotated in that direction. The reason for this, as it will be recalled, is that the other pawl and ratchet arrangement 84, 86 is exerting a positive hold on shaft 56 against rotation in the clockwise direction 64.

Reference should now be made to FIG. 7 which illustrates an exemplary field installation of the within inventive counting mechanism 50 on a typical 275 gallon oval fuel storage tank 114. The cable connection 62 from mechanism 50 is to a suitable float 116 which, as illustrated in FIG. 7, is disposed in floating relation on the surface of the body or volume of fuel 118 in the storage tank 114. In a typical situation, when consumption of the fuel 118 reaches a point where the storage volume is only 30 gallons and thus at the fuel line designated by the reference numeral 120, a delivery would be ordered to replenish the supply. Tank 114 would then typically be filled to the 265 fuel line level illustrated in phantom perspective and designated 122. Relating the operation of counting mechanism 50, as previously described, to the practice just noted in connection with fuel tank 114, it would then follow that at the 265 gallon fuel level 122 counter 58 will advantageously be at the "0" reference starting point. As fuel is consumed, and consequently, as float 116 descends from the fuel level 122 to the fuel level 120, counter 58 will record the amount of fuel consumed. Let it be assumed that when counter 58 records the consumption of 235 gallons of fuel, that this would be the signal for another delivery being required to replenish the supply. Assuming such delivery is made, filling of the tank 114 would again raise the float 116 from level 120 to level 122, and thus cause subtraction in the counter 58 resulting in a digital display thereof at the reference point "0".

During ascending movement of float 116, the cumulative counter 72 of mechanism 50 would record that the tank 114 has been filled with 235 gallons of fuel oil. Counter 72 would make such a recording each time that tank 114 is filled and would therefore provide a cumulative total of the amount of fuel which has been supplied during successive fillings of the tank 114 over the heating season.

It will be understood that by both appropriate selection and calibration of the counters 58 and 72 in the counting mechanism 50, that the display of these counters will be in gallons and thus in appropriate measurement units for the liquid 118. This calibration, however, is not absolutely necessary. The actual numerical display of the counters 58 and 72 can be related to numbers of a chart which by mathematical calculation will indicate in gallons or other appropriate measurements for liquid how much fuel is involved in successive fillings of the tank 114, and how much fuel is consumed between fillings.

As understood, fuel storage tanks in households may typically be in the oval shape in which tank 114 is depicted, or may also be in a cylindrical shape. A cylindrical shaped tank provides a desirable linear relationship between ascending and descending movements of float 116 and rotations of the wheels of the counters 58 and 72, a relationship which in connection with the oval tank 114 exists only at the central portion 124.

When installed on an oval tank 114, it is therefore desirable that provision be made in the mechanism 50 to account for the non-linear relationship that exists per inch of vertical movement of the float 116 in the tank portions on opposite sides of the central portion 124. That is, and as should be readily apparent, an inch of movement in the tank area 124 involves a greater volume of fuel than that same inch of movement in either of the tank portions immediately above and below central portion 124 and bounded at one side by the lower level 120 and at the other side by the upper level 122. Proper adjustment in the counting operation of mechanism 50 may be achieved in any number of different ways. It will also be understood that the inaccuracy in the digital display that the non-linear portions of tank 114 will produce is not that significant and, in some instances where absolute accuracy is not required, may be disregarded.

However, in installations where utmost accuracy is required, the preferred way of making proper adjustment for the non-linear portions of an oval tank 114 is in the contour design of the spool 60. Referring to FIGS. 8 and 9, it will be understood that the enlarged diameter portions of spool 60, designated 125 and 126, correspond respectively to the non-linear tank portions 128 and 130, respectively. The central and smaller diameter hub portion 132 is related to the tank linear portion 124.

Using each inch of vertical movement of float 116 as the standard, it should be understood, as already noted, that each such inch of movement in the tank portions 128 and 130 involves a smaller amount of fuel than the same inch of movement in the central tank portion 124. To compensate or adjust for this it is therefore necessary that a greater length of the cable 62 be permitted to be wound on the spool 60 when the float is in the areas 128 and 130 than when the float is in the central area 124. This follows from the fact that the length of cable 62, since it is wrapped about the spool 60, determines the extent of revolutions of shaft 54 and thus determines the counting operation of counter 58, directly, and the counting operation of the cumulative counter 72, indirectly via the intermeshing gears 74 and 76. If more cable is therefore required to produce one revolution in the input shafts to the counters because a greater cable length is required for one helical wrap about the enlarged diameter sections 125 and 126, this in effect will result in requiring a greater movement of the float 116 than one inch when the float is in the tank sections 128 and 130. Thus, when operating in the tank central area 124, a one inch movement of the float 116 will produce a rotation of the input shafts to the counters; when in the tank areas 128 and 130, however, the same one revolution that is produced in the counters requires more than an inch of movement of the float 116. This additional movement of the float 116 is effective in increasing the volume that is supervised by float movement in the tank portions 128 and 130 and thus brings it into calibration with the larger central tank portion 124.

In addition to the enlarged diameter sections 125 and 126, spool 60 also has fingers 134 and 136 to assist in easing the cable from the enlarged diameter section 125 onto the smaller central portion 132 and then from this section onto the other enlarged diameter section 126.

SUMMARY

From the foregoing description it should be readily appreciated that there has been described herein an improved counting mechanism 50 adapted to be used as an attachment for a fuel tank wherein an accurate record is provided of the successive fillings of fuel made to the storage tank, such as occurs over the winter months or other heating season, and also an accurate record of the amount of fuel consumed between successive fillings. The latter record of course alerts the home owner when to order a replenishing supply of fuel. It also provides an indication of efficiency of use of the fuel. The cumulative record provided by counter 72 also is a particularly useful indication of fuel use efficiency. Most important, and as has been described herein in detail, the within inventive counting mechanism is not vulnerable to inaccuracy, as were prior art counting mechanisms, because of any malfunctioning in a clutch or by any other aspect of its operational mode which could possibly interfere with the counting record being provided by the counters.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. A counting mechanism adapted for use as an attachment to a fuel tank so as to record the cumulative amount of fuel resulting from the successive filling of said tank and also to record the amount of fuel removed therefrom incident to heating use of said fuel following each said filling, said mechanism comprising two counter-operating rotatable shafts, a first counter and a second counter respectively mounted on each said shaft so as to provide counting operation in response to shaft rotation, each said counter being of the type that adds in one shaft rotational direction and subtracts in the opposite shaft rotational direction, shaft rotation-powering means operatively connected to said shaft of said first counter and responsive to fuel level changes in said fuel tank so as to cause rotation in said shaft of said first counter such that said first counter adds from a selected starting reference number to a higher number in response to shaft rotation corresponding to a descending fuel level change so as to record the amount of fuel being consumed and subsequent thereto subtracts back to said selected starting reference numeral in response to opposite shaft rotation corresponding to an ascending fuel level change, a gear fixedly mounted on said first counter shaft and a cooperating second gear disposed in intermeshing relation therewith mounted on bearing means so as to be free wheeling relation on said second counter shaft such that said rotational movements in both rotational directions of said first counter shaft responsive to said fuel level changes are imparted to said free wheeling second gear, and a pawl on said second gear and a ratchet fixedly mounted on said second counter shaft disposed in cooperating operative relation with each other such that said pawl drivingly engages said ratchet to cause corresponding rotation in said second counter shaft in one rotational direction but not in said opposite rotational direction, whereby said second counter is adapted to add cumulatively in response to successive shaft rotations corresponding to ascending fuel level changes to provide a number record of the successive fuel tank fillings without there being any subtraction from such number during rotation of said second gear corresponding to a descending fuel level change.

2. A fuel tank counting mechanism attachment as claimed in claim 1 including a second pawl and ratchet operatively associated with said shaft of said second counter so as to block rotation thereof in said direction as might produce subtraction in said second counter but allowing shaft rotation in said opposite rotational direction, to thereby obviate any inaccuracy in said cumulative number being recorded by said second counter.

3. A fuel tank counting mechanism attachment as claimed in claim 2 whereby both said pawls are fabricated of a springy material, whereby each is adapted to maintain physical contact with said cooperating ratchet under a spring urgency.

4. A fuel tank counting mechanism attachment as claimed in claim 3 including a constant torque spring mounted on a third shaft and operatively coupled to said first counter shaft so as to be operatively arranged to power said first counter shaft in that rotational direction corresponding to an ascending fuel level change, and wherein said shaft-powering means is comprised of a spool fixedly mounted on said first counter shaft and a cable connected to extend therefrom to a float disposed in floating relation on the body of fuel in said fuel tank, whereby during any descending fuel level change there is corresponding descending movement of said float which is effective to cause rotation in said first counter shaft and during any ascending fuel level change said constant torque spring is released so as to effectively cause opposite direction rotation in said first counter shaft.

5. A fuel tank counting mechanism attachment as claimed in claim 4 wherein said spool is fabricated with a contour appropriately calibrated to the shape of the internal chamber of said fuel tank, whereby said numbers recorded by said first and second counters are adapted to be correspondingly calibrated to measurement units appropriate for a liquid.

* * * * *